US011537417B2

(12) United States Patent
Pratt et al.

(10) Patent No.: US 11,537,417 B2
(45) Date of Patent: Dec. 27, 2022

(54) TASK DELEGATION AND COOPERATION FOR AUTOMATED ASSISTANTS

(71) Applicant: AT&T Intellectual Property I, L.P., Atlanta, GA (US)

(72) Inventors: James Pratt, Round Rock, TX (US); Timothy Innes, Atlanta, GA (US); Eric Zavesky, Austin, TX (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 592 days.

(21) Appl. No.: 16/595,645

(22) Filed: Oct. 8, 2019

(65) Prior Publication Data

US 2021/0103452 A1  Apr. 8, 2021

(51) Int. Cl.
   *G06F 16/245* (2019.01)
   *G06F 9/451* (2018.01)
   *G06F 16/242* (2019.01)
   *G06Q 30/02* (2012.01)

(52) U.S. Cl.
   CPC ............ *G06F 9/453* (2018.02); *G06F 16/243* (2019.01); *G06F 16/245* (2019.01); *G06Q 30/0283* (2013.01)

(58) Field of Classification Search
   CPC ...... G06F 9/453; G06F 16/243; G06F 16/245; G06F 16/3329; G06Q 30/0283
   See application file for complete search history.

(56) References Cited

U.S. PATENT DOCUMENTS

| 9,276,802 | B2* | 3/2016 | Lynch | H04L 67/00 |
|---|---|---|---|---|
| 10,304,455 | B1* | 5/2019 | Ulaganathan | G10L 15/1815 |
| 10,802,872 | B2* | 10/2020 | Gopalan | H04L 67/16 |
| 2013/0081032 | A1* | 3/2013 | Levien | G06Q 10/06311 |
| | | | | 718/102 |
| 2015/0215350 | A1* | 7/2015 | Slayton | H04L 65/403 |
| | | | | 709/204 |
| 2017/0249580 | A1* | 8/2017 | Newman | G06Q 10/1095 |
| 2017/0249600 | A1* | 8/2017 | Cranshaw | G06Q 10/1097 |
| 2017/0270488 | A1* | 9/2017 | Spencer, Jr. | G06Q 10/1097 |

(Continued)

FOREIGN PATENT DOCUMENTS

| CA | 3039571 A1 * | 5/2018 | G05B 19/406 |
|---|---|---|---|
| CN | 106406993 A * | 2/2017 | G06F 9/4843 |
| WO | WO-2020005164 A1 * | 1/2020 | B25J 9/1674 |

*Primary Examiner* — Yongjia Pan

(57) ABSTRACT

The present disclosure provides task delegation and cooperation for automated assistants. In one example, a method performed by a processing system that is in communication with a plurality of automated assistants includes receiving, a query indicating a task with which a user desires assistance, parsing the task into a plurality of sub-tasks including a first sub-task and a second sub-task, identifying a first automated assistant of the plurality of automated assistants that is capable of performing the first sub-task and a second automated assistant of the plurality of automated assistants that is capable of performing the second sub-task, and formulating a proposal for responding to the query, wherein the proposal comprises a sequence in which the plurality of sub-tasks is to be performed and a mapping that assigns the first sub-task to the first automated assistant and the second sub-task to the second automated assistant.

20 Claims, 3 Drawing Sheets

(56) References Cited

U.S. PATENT DOCUMENTS

| | | | |
|---|---|---|---|
| 2019/0103103 A1* | 4/2019 | Ni | G06F 3/167 |
| 2019/0371315 A1* | 12/2019 | Newendorp | G10L 15/22 |
| 2020/0081736 A1* | 3/2020 | Gopalan | H04L 67/327 |
| 2020/0137230 A1* | 4/2020 | Spohrer | H04M 3/527 |

* cited by examiner

TASK DELEGATION AND COOPERATION FOR AUTOMATED ASSISTANTS

The present disclosure relates generally to artificial intelligence, and relates more particularly to systems, non-transitory computer-readable media, and methods for providing task delegation and cooperation for automated assistants.

BACKGROUND

Automated digital assistants (also sometimes referred to as "bots") are software applications that run automated tasks, often over the Internet. The automated tasks are typically simple and structurally repetitive, and can be performed by the automated digital assistants at a much higher rate than would be possible for a human to perform.

SUMMARY

The present disclosure provides task delegation and cooperation for automated assistants. In one example, a method performed by a processing system that is in communication with a plurality of automated assistants includes receiving, a query indicating a task with which a user desires assistance, parsing the task into a plurality of sub-tasks including a first sub-task and a second sub-task, identifying a first automated assistant of the plurality of automated assistants that is capable of performing the first sub-task and a second automated assistant of the plurality of automated assistants that is capable of performing the second sub-task, and formulating a proposal for responding to the query, wherein the proposal comprises a sequence in which the plurality of sub-tasks is to be performed and a mapping that assigns the first sub-task to the first automated assistant and the second sub-task to the second automated assistant.

In another example, a device includes a processor of a centralized support center that is in communication with a plurality of automated assistants and a computer-readable medium storing instructions which, when executed by the processor, cause the processor to perform operations. The operations include receiving, a query indicating a task with which a user desires assistance, parsing the task into a plurality of sub-tasks including a first sub-task and a second sub-task, identifying a first automated assistant of the plurality of automated assistants that is capable of performing the first sub-task and a second automated assistant of the plurality of automated assistants that is capable of performing the second sub-task, and formulating a proposal for responding to the query, wherein the proposal comprises a sequence in which the plurality of sub-tasks is to be performed and a mapping that assigns the first sub-task to the first automated assistant and the second sub-task to the second automated assistant.

In another example, a non-transitory computer-readable storage medium stores instructions which, when executed by a processor of a centralized support center that is in communication with a plurality of automated assistants, cause the processor to perform operations. The operations include receiving, a query indicating a task with which a user desires assistance, parsing the task into a plurality of sub-tasks including a first sub-task and a second sub-task, identifying a first automated assistant of the plurality of automated assistants that is capable of performing the first sub-task and a second automated assistant of the plurality of automated assistants that is capable of performing the second sub-task, and formulating a proposal for responding to the query, wherein the proposal comprises a sequence in which the plurality of sub-tasks is to be performed and a mapping that assigns the first sub-task to the first automated assistant and the second sub-task to the second automated assistant.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides task delegation and cooperation for automated assistants. As discussed above, automated digital assistants are software applications that run automated tasks, often over the Internet. The automated tasks are typically simple and structurally repetitive, and can be performed by the automated assistants at a much higher rate than would be possible for a human to perform. However, the ability of conventional automated assistants to cooperate on tasks that may involve operations performed by multiple different automated assistants is limited. For instance, some automated assistants are programmed to respond to a limited set of predefined queries, and cannot respond to queries outside of that limited set.

Other automated assistants may be capable of addressing one or more portions of more complex queries, but may lack the mechanisms to effectively resolve conflicts with other automated assistants. For instance, two different automated assistants (which may be provided by the same vendor or may be provided by two different vendors) may be carrying out two different operations in the same temporal workspace. However, it may not be desirable for the operations of one automated assistant to be started until the operations of the other automated assistant have been completed, or at least performed to a specific point. As an example, a home renovation project may employ a first automated assistant to control and schedule work orders for hanging drywall and a second automated assistant to control and schedule work orders for installing plumbing. Without a specific service level agreement (SLA) negotiated between the vendors that provide the automated assistants, however, it may be difficult to ensure that the dry wall is not hung until the after the plumbing is installed (e.g., as each vendor, working independently of the other(s), may seek preferential scheduling or approval statuses).

Examples of the present disclosure provide automated assistants that are capable of breaking a complex query into a plurality of smaller sub-tasks, which may be assigned to a plurality of different automated assistants. Further examples of the present disclosure create a functionality-based "exchange" via which the automated assistants that are most appropriate for handling the sub-tasks may be identified. Still further examples of the present disclosure evaluate the scheduling and assignment of the sub-tasks among the plurality of different automated assistants in order to minimize conflicts between the different automated assistants. This allows the query to be resolved in an optimal manner by delegating different sub-tasks to the automated assistants that are best-suited to perform the sub-tasks and by ensuring that conflicts do not needlessly delay resolution of the query.

Figure 1:
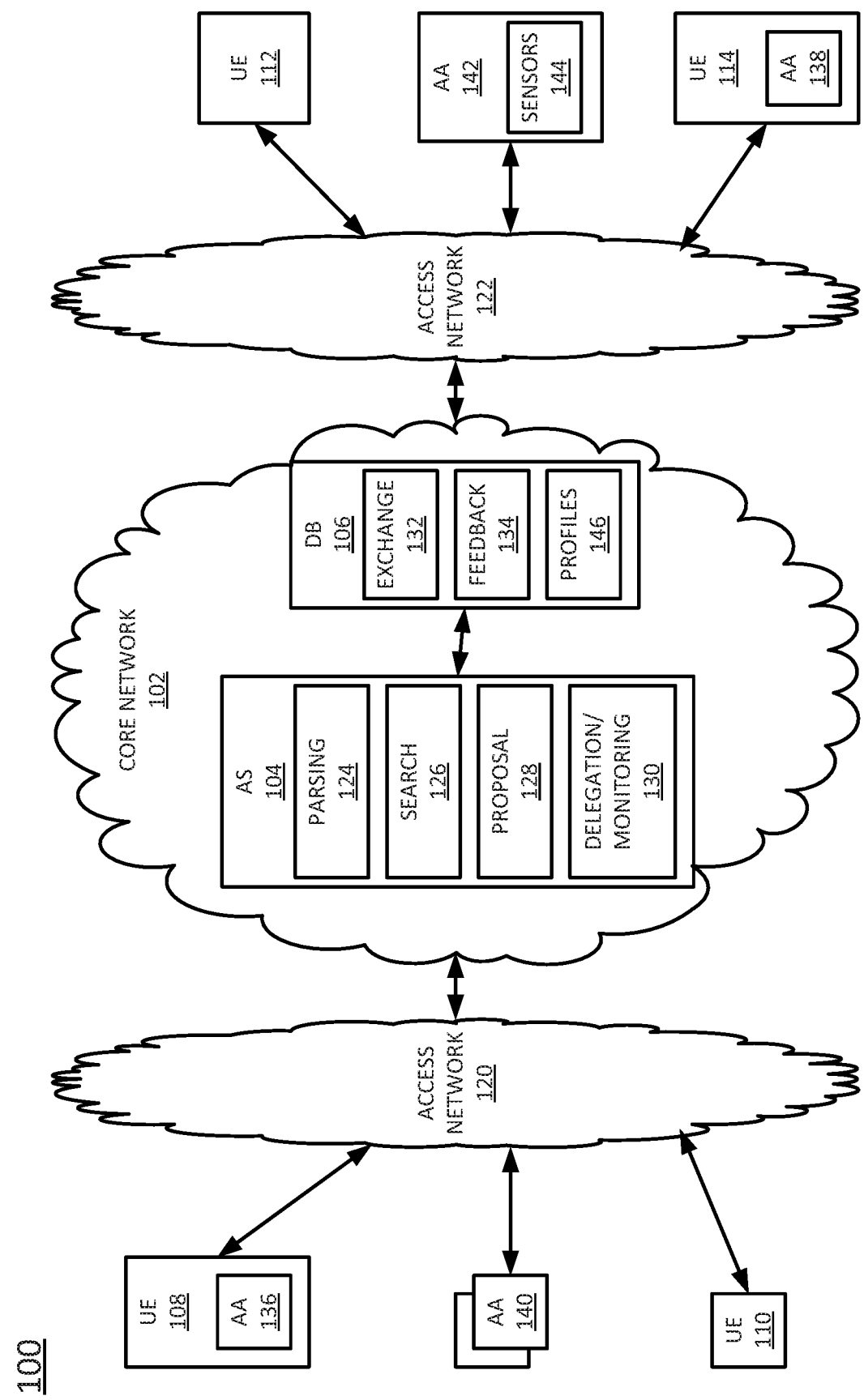
FIG. 1 illustrates an example network related to the present disclosure.

To better understand the present disclosure, FIG. 1 illustrates an example network 100 related to the present disclosure. The network 100 may be any type of communications network, such as, for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G, 4G, 5G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, the core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may also further comprise an Internet Service Provider (ISP) network. In one example, the core network 102 may include an application server (AS) 104 and a database (DB) 106. Although a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (UEs) 108 and 110, while the access network 122 may be in communication with one or more UEs 112 and 114. In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In a further example, the user endpoint devices 108, 110, 112, and 114 may include smart home or IoT devices, such as smart doorbells, smart thermostats, smart lighting systems, smart locks, smart appliances, a smart in-vehicle assistant, or the like. In addition, some of the UEs 108, 110, 112, and 114 may include sensors (e.g., imaging sensors, audio sensors, thermal sensors, pressure sensors, light sensors, smoke sensors, humidity sensors, motion sensors, gyroscopes, accelerometers, and/or the like) for detecting information about a surrounding environment. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one example, the endpoint devices 108 and 114 may have installed thereon an automated assistant (AA) 136 or 138, respectively. The AAs 136 and 138 may comprise software applications that are programmed to allow the respective UEs 108 and 114 to perform tasks or sub-tasks, potentially under the direction of an individual or the AS 104. As such, the AAs 136 and 138 may perform all or part of the method discussed below in conjunction with FIG. 2, which relates to delegating and coordinating sub-tasks of query among a plurality of automated assistants.

The access networks 120 and 122 may also be in communication with AAs 140 and 142, respectively, that are not installed on UEs. These AAs 140 and 142 may comprise, for instance, hardware devices such as robots, drones, or unmanned vehicles that are capable of performing tasks and sub-tasks under the direction of an individual or the AS 104 (e.g., the hardware devices can carry out the tasks or subtasks, possibly while meeting certain criteria such as time limits, cost restrictions, and/or the like). The AAs 140 and 142 may also comprise software programs that contain executable code which, when executed by a processor or processing system, cause the processor or processing system to carry our specific operations. As such, the AAs 140 and 142 may perform all or part of the method discussed below in conjunction with FIG. 2, which relates to delegating and coordinating sub-tasks of query among a plurality of automated assistants.

In one example, the AAs 140 and 142 may have both cellular and non-cellular access capabilities and may further have wired communication and networking capabilities. In addition, some of the AAs 140 and 142 may include sensors 144 (e.g., imaging sensors, audio sensors, thermal sensors, pressure sensors, light sensors, smoke sensors, humidity sensors, motion sensors, gyroscopes, accelerometers, and/or the like) for detecting information about a surrounding environment.

The AAs 136, 138, 140, and 142 may communicate with each other as well as with the AS 104 (e.g., via digital application programming interfaces). The AAs 136, 138, 140, and 142 may also communicate with humans (e.g., via input/output devices such as a display, a speaker, a keyboard, a camera, a microphone, a haptic device, or the like). The AAs 136, 138, 140, and 142 may be owned and operated by individuals (e.g., the same individuals who own and operate the UEs 108, 110, 112, and 114) or by service providers who make the AAs 136, 138, 140, and 142 available for performing tasks on behalf of the individuals and/or service providers. It should be noted that although four AAs are illustrated in FIG. 1, any number of AAs may be deployed.

Figure 3:
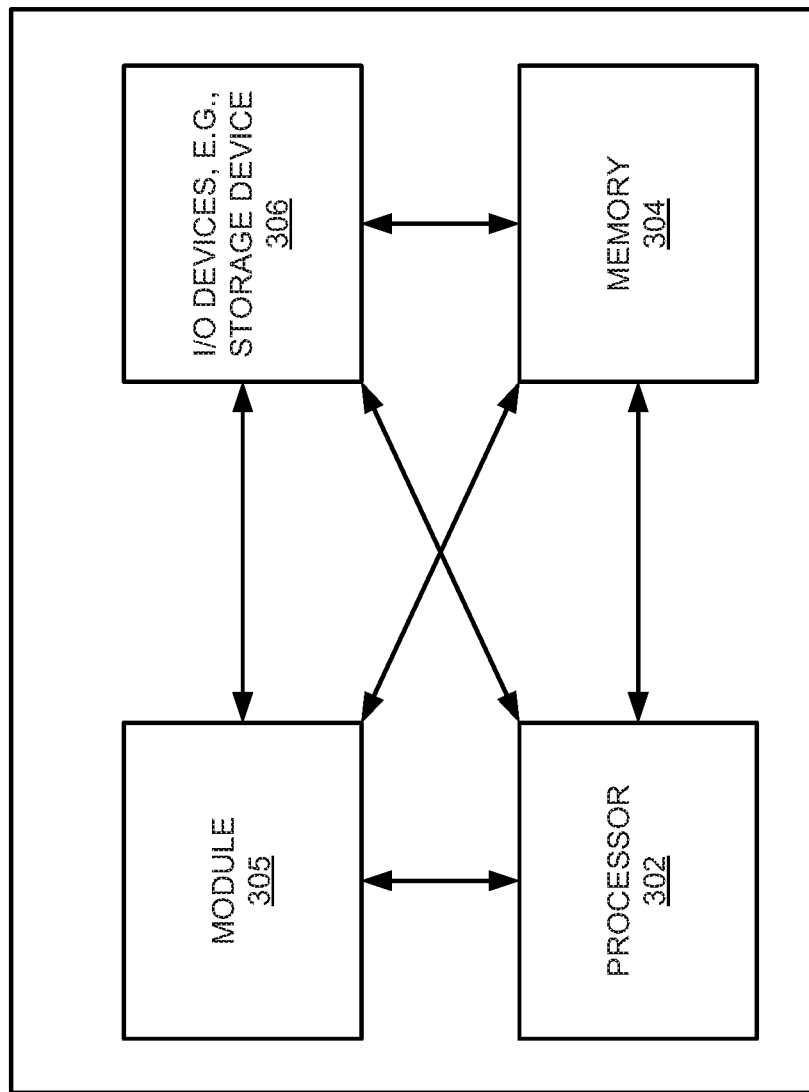
FIG. 3 depicts a high-level block diagram of a computing device specifically programmed to perform the functions described herein.

The AS 104 may comprise a computer specifically programmed to operate as a special purpose computer, as illustrated in FIG. 3 and discussed below. In one example, the AS 104 may perform the methods discussed below related to providing task delegation and coordination for automated assistants. For instance, in one example, the AS 104 hosts an application that receives requests for assistance from UEs operated by users, parses sub-tasks from the requests, and delegates the sub-tasks to a plurality of automated assistants. In this way, the AS 104 may function as a centralized support center for orchestrating task performance. To this end, the AS 104 may include a parsing engine 124, a search engine 126, a proposal formulation engine 128, and/or a delegation and monitoring engine 130.

In one example, the parsing engine 124 may comprise a device that parses a user query into a plurality of sub-tasks. In one example, parsing of the query into sub-tasks may involve applying one or more techniques to parse a meaning from the query. For instance, natural language understanding may be applied to determine that the query, "I am heading home and hungry," includes at least two sub-tasks: e.g., providing directions from the user's current location to the user's home and making arrangements to provide food to the user. In addition, each of these sub-tasks may include its own set of sub-tasks, which may be parsed by the parsing engine or by an automated assistant to which the sub-task is assigned, as described in further detail below. By accessing the user's preferences (which may be stored in a user profile, e.g., in the DB 106), the parsing engine 124 may parse additional, implied sub-tasks from the query, such as preparing the user's home for his return.

In one example, the parsing engine 124 may correlate the sub-tasks with user-specific information, which may be stored in the user profile, in order to add nuance to the sub-tasks. For instance, certain terms used by the user in the query may be subjective or may have particular meaning to the user. As an example, as discussed above, the sub-task of providing directions to the user's home may involve determining the user's current mode of transportation. The user's profile may indicate the user's typical working hours and may further indicate that the user drives to and from work. In this case, if the query, "I am heading home and hungry" is received around the time of day that the user normally leaves work, and the user's current location is determined to be his or her place of employment, then the parsing engine 124 may infer that the user is currently traveling by car.

The parsing engine 124 may also identify sub-tasks or other aspects of the query that require more information. For instance, even where a user profile may provide insight into the meanings of some query terms, the profile may still be deficient with respect to other query terms. As an example, the profile may not indicate the user's preferred types of food. In this case, the parsing engine 124 may request additional information, e.g., directly from the user. Moreover, by requesting the additional information from the user, the parsing engine 124 may learn user preferences and patterns, which may be used to augment the user profile so that the user profile is more useful when parsing future queries.

In one example, the search engine 126 may comprise a device that is configured to search a repository or exchange of automated assistants (e.g., part of DB 106) for automated assistants that may be capable of performing the sub-tasks identified by the parsing engine 124. For instance, the exchange may index a plurality of automated assistants according to the features and functions of the automated assistants. The index may include tags or metadata referencing the features and functionalities of the automated assistants, e.g., such that the search engine may match a keyword or keywords of a sub-task (e.g., "driving directions") to the tags or metadata associated with an automated assistant that is capable of performing the sub-task. In one example, the user profile may be consulted to guide the search of the exchange. For instance, automated assistants that have been used in the past to respond to queries from the user may be promoted or demoted for consideration based on the user's feedback, as discussed in further detail below.

In one example, the proposal formulation engine 128 may comprise a device that is configured to formulate a proposal for responding to the query, where the proposal arranges the plurality of sub-tasks in an ordered list and maps the candidate automated assistants to the sub-tasks. For instance, the ordered list of sub-tasks may identify each of the sub-tasks that should be performed in order to fully respond to the query, as well as an order or sequence in which the sub-tasks should be performed to avoid conflicts. As discussed above, it may not be desirable to begin certain sub-tasks until certain other sub-tasks have been completed. In other cases, it may be possible to perform certain sub-tasks in parallel, or to interrupt certain sub-tasks to perform certain other sub-tasks. The mapping may assign, to each of the sub-tasks, at least one of the candidate automated assistants identified by the search engine 126. In one example, the proposal formulation engine 128 may formulate a plurality of different proposals and determine which proposal of the plurality of proposals best responds to the query while also satisfying some constraint. The constraint may include, for example, the monetary cost of the proposal (e.g., the cost of utilizing the candidate automated assistants as well as the cost of performing the sub-tasks), the estimated amount of time needed for the proposal to fully respond to the query, or other constraints.

In one example, the delegation and monitoring engine 130 may comprise a device configured to provide instructions to automated assistants that are selected for carrying out the sub-tasks and to monitor the progress of the sub-tasks. Monitoring may be accomplished through the selected automated assistants sending updates to the delegation and monitoring engine 130 (e.g., periodically, when sub-tasks or specified percentages of sub-tasks are completed, in response to inquiries from the processing system, etc.). Based on the monitoring (e.g., on the statuses of the sub-tasks), the delegation and monitoring engine 130 may modify or update the instructions previously sent to automated assistants, may send new instructions instructing automated assistants to abandon previously delegated sub-tasks, and/or may send new instructions to newly selected automated assistants for carrying out newly added and/or reassigned sub-tasks. In some examples, the delegation and monitoring engine 130 may also inform a first automated assistant when a sub-task performed by a second automated assistant, on which a sub-task to be performed by the first automated assistant is dependent, has been successfully completed.

In one example, the DB 106 stores information relating to automated assistants that have registered with an exchange 132 via which the automated assistants advertise their availability to provide certain functionalities. The exchange 132 may include, for each registered automated assistant, a primary and/or any secondary functionalities of the automated assistant (e.g., navigation services, ordering food from a specific restaurant, controlling IoT devices, etc.). In addition, the exchange may be indexed by stored proposals or workflows that employed the services of the automated assistant. In this case, if a current query shares similarities with a previously received query, the previously received query may be used as a search term or criterion to identify the automated assistants that performed the sub-tasks associated with the previous query. In a further example, the exchange may provide feedback or ratings provided by users who have used the automated assistant to perform sub-tasks.

In a further example, the DB 106 may also store a repository 134 of feedback, which may include feedback from users from whom past queries were received. For instance, this feedback may indicate whether the queries were responded to (e.g., sub-tasks completed) to the users' satisfaction or whether the users suggested improvements for responding to the queries. The repository 134 of feedback may also include feedback from automated assistants. For instance, this feedback may indicate whether any problems were encountered in performing any sub-tasks and/or what actions were taken to resolve the problems.

In a further example, the DB 106 may include a repository 146 of user data. In addition, the user data may include information about users' preferences, for example in the forms of profiles, query and feedback histories, or the like. User data may be used, for example, to disambiguate between potential meanings of queries, to identify preferred automated assistants for carrying out sub-tasks, or to improve the quality of response to user queries in other ways.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional robots, endpoint devices, sensors, access networks, network elements, application servers, etc. without altering the scope of the present disclosure.

Figure 2:
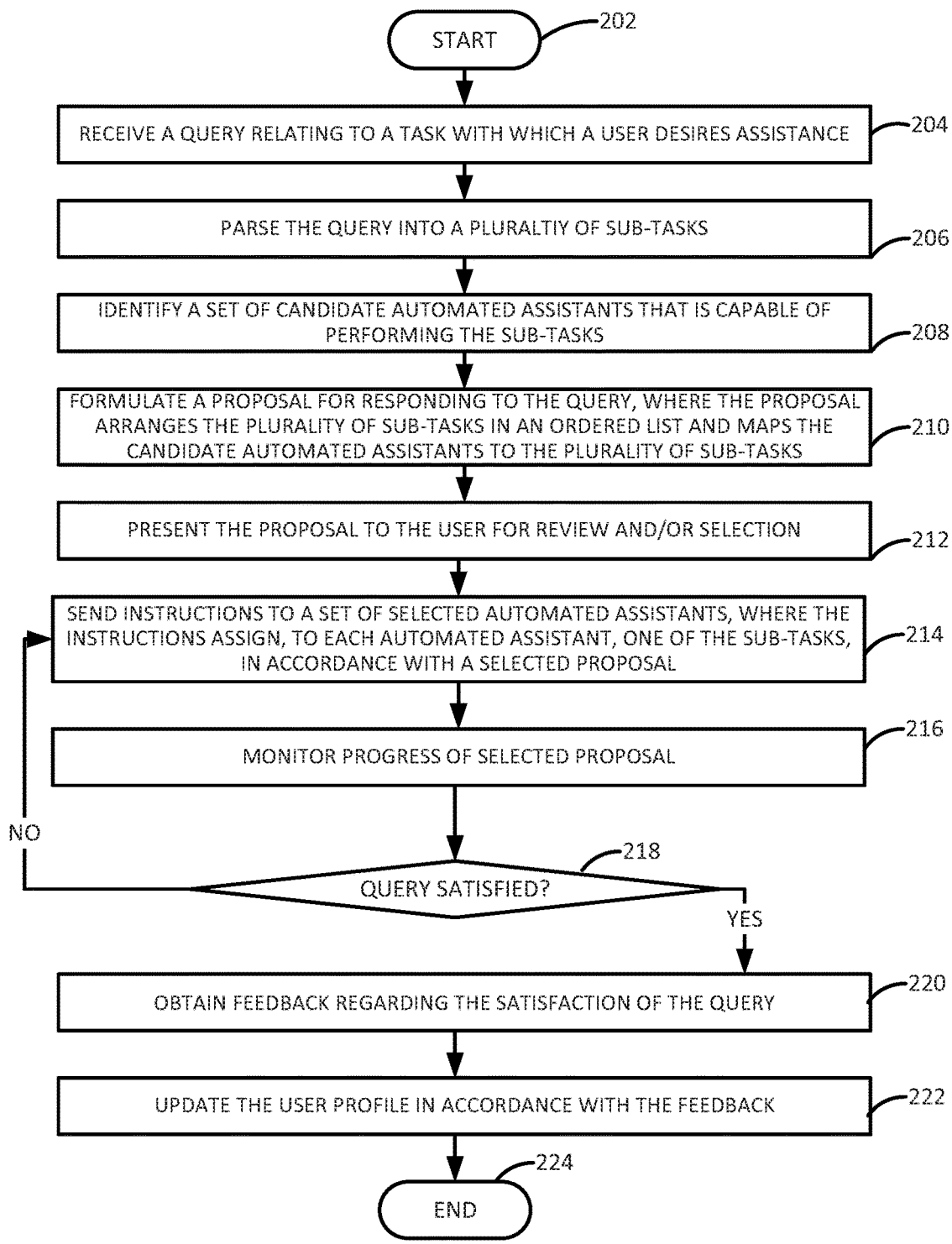
FIG. 2 illustrates a flowchart of an example method for providing task delegation for automated assistants.

To further aid in understanding the present disclosure, FIG. 2 illustrates a flowchart of an example method 200 for providing task delegation for automated assistants. In one example, the method 200 may be performed by an application server, e.g., AS 104 illustrated in FIG. 1. The application server may host a service that parses queries into sub-tasks, identifies automated assistants that are capable of performing the sub-tasks, and delegates the sub-tasks to the automated assistants. However, in other examples, the method 200 may be performed by another device. For instance, any one of the automated assistants 136, 138, 140, or 142 may be configured to perform all or part of the method 200. As such, any references in the discussion of the method 200 to components of the network illustrated in FIG. 1 are not intended to limit the means by which the method 200 may be performed. By way of example, the method 200 is described as being performed by a processing system, such as the processing system 402 illustrated in FIG. 3.

The method 200 begins in step 202. In step 204, the processing system may receive a query from a user, e.g., via an application executing on an end user device operated by the user. In one example, the query may relate to a task with which the user desires assistance. For instance, the user may speak or type the phrase, "I am heading home and hungry." In further examples, other modalities can also be used for receiving queries. For instance, the user may make a gesture that is associated with a specific query, may press a button on the end user device that is associated with a specific query, may hold the end user device in an orientation (e.g., tilt, turn, shake, etc.) that is associated with a specific query, or the like.

In step 206, the processing system may parse the query into a plurality of sub-tasks. In one example, parsing of the query into sub-tasks involves applying one or more techniques to parse a meaning from the query. For instance, natural language understanding may be applied to determine that the query, "I am heading home and hungry," includes at least two sub-tasks: e.g., providing directions from the user's current location to the user's home and making arrangements to provide food to the user. In addition, each of these sub-tasks may include its own set of sub-tasks. For instance, providing directions may also include determining the user's current location and/or mode of transportation (e.g., car, train, bus, etc.). Making arrangements to provide food may involve determining the current time of day (e.g., breakfast time, lunch time, or dinner time), identifying the user's preferred types of food (e.g., Italian, spicy, vegetarian, etc.), and/or identifying businesses that can provide the user's preferred types of food at the current time of day (e.g., fast food, diner, takeout, etc.). Depending on the user's preferences (which may be stored in a user profile), the query may imply additional sub-tasks, such as preparing the user's home for his return (e.g., which may include further sub-tasks of turning on the lights, raising the temperature of the thermostat, and the like).

In one example, parsing the sub-tasks in accordance with step 206 may include correlating the sub-tasks with user-specific information, which may be stored in the user profile, in order to add nuance to the sub-tasks. For instance, certain terms used by the user in the query may be subjective or may have particular meaning to the user. As an example, as discussed above, the sub-task of providing directions to the user's home may involve determining the user's current mode of transportation. The user's profile may indicate the user's typical working hours and may further indicate that the user drives to and from work. In this case, if the query, "I am heading home and hungry" is received around the time of day that the user normally leaves work, and the user's current location is determined to be his or her place of employment, then the processing system may infer that the user is currently traveling by car. Similarly, if the user's profile indicates that the user is a vegetarian, the processing system may infer that the user does not want fast food. The user profile may store information that is explicitly provided by the user (e.g., the user may enter information into a plurality of predefined fields intended to solicit the user's interests and preferences) and/or information that is inferred by the processing system from previous queries or feedback from the user (e.g., the processing system may detect that the user often orders food from a specific restaurant or requests navigation assistance to the same location at approximately the same time of day, Monday through Friday). Thus, the processing system may disambiguate between multiple potential meanings for a query based on information in the user profile, a context of the user's present circumstances (e.g., at the time the query is submitted), or other user-specific information.

Parsing the sub-tasks in accordance with step 206 may also include identifying sub-tasks that require more information before the sub-tasks can be effectively delegated. For instance, even where a user profile may provide insight into the meanings of some query terms, the profile may still be deficient with respect to other query terms. As an example, the profile may not indicate the user's preferred types of food. In this case, parsing the sub-tasks may involve requesting additional information, e.g., directly from the user. For instance, the processing system may prompt the user to provide one or more preferred types of food in order to define the sub-task of making arrangements to provide food to the user. Moreover, by prompting the user for additional information, the processing system may learn user preferences and patterns, which may be used to augment the user profile so that the user profile is more useful when parsing future queries.

In a further example, parsing the sub-tasks may include identifying an order in which the sub-tasks should be performed. For instance, as discussed above, it may not be desirable to begin certain sub-tasks until certain other sub-tasks have been completed. In other cases, it may be possible to perform certain sub-tasks in parallel, or to interrupt certain sub-tasks to perform certain other sub-tasks. As an example, where the sub-tasks include providing directions to a user's home and making arrangements to provide food to the user, it may be possible to make arrangements for the user to stop for takeout at a restaurant that is along the user's route home.

In step 208, the processing system may identify a set of (e.g., two or more) candidate automated assistants that is capable of performing the sub-tasks. In one example, the processing system may search a repository or exchange (e.g., such as DB 106 of FIG. 1) that contains information about the capabilities of a plurality of automated assistants. For instance, the exchange may index a plurality of automated assistants according to the features and functions of the automated assistants. The index may include tags or metadata referencing the features and functionalities of the automated assistants, e.g., such that the processing system may match a keyword or keywords of a sub-task (e.g., "driving directions") to the tags or metadata associated with an automated assistant that is capable of performing the sub-task. The set of candidate automated assistants identified in step 208 may thus comprise a subset of the automated assistants for which information is stored in the repository. For example, the set of automated assistants may include at least a first automated assistant that is capable of performing a first sub-task and a second automated assistant that is capable of performing a second sub-task. In one example, a user profile may be consulted to guide identification of the set of candidate automated assistants. For instance, automated assistants that have been used in the past to respond to queries from the user may be promoted or demoted for consideration based on the user's feedback.

In one example, more than one candidate automated assistant may be identified for at least one of the sub-tasks. That is, for any given sub-task, the processing system may identify multiple candidate automated assistants, and further processing and analysis may be performed (e.g., in accordance with the steps described below) in order to select a candidate automated assistant that is best suited to perform the sub-task within the particular context of the query received in step 204.

In step 210, the processing system may formulate a proposal for responding to the query, where the proposal arranges the plurality of sub-tasks in an ordered list and maps the candidate automated assistants to the sub-tasks. In one example, the ordered list of sub-tasks may be derived from the parsing performed in step 206. For instance, the ordered list of sub-tasks may identify each of the sub-tasks that should be performed in order to fully respond to the query, as well as an order or sequence in which the sub-tasks should be performed to avoid conflicts. In some examples, some sub-tasks may be performed in parallel to expedite the response to the query. The mapping may assign, to each of the sub-tasks, at least one of the candidate automated assistants identified in step 208 (e.g., a first sub-task to a first candidate automated assistant, a second sub-task to a second candidate automated assistant, etc.). It should be noted, however, that the mapping will not necessarily result in a one-to-one correspondence between sub-tasks and automated assistants. For instance, multiple sub-tasks could be delegated to a single automated assistant, or one sub-task could be shared by two or more automated assistants.

In one example, formulating the proposal may include evaluating a plurality of different proposals and determining which proposal of the plurality of proposals best responds to the query while also satisfying some constraint. The constraint may include, for example, the monetary cost of the proposal (e.g., the cost of utilizing the candidate automated assistants as well as the cost of performing the sub-tasks), the estimated amount of time needed for the proposal to fully respond to the query, or other constraints. In further examples, a plurality of constraints may be balanced against each other (where the relative priorities of the various constraints may be specified by the user profile). As an example, the sub-task of making arrangements to provide food to a user who is heading home could be fulfilled by arranging for the user to stop on the way home for takeout or by arranging for food to be delivered to the user's home sometime after the user is expected to arrive home. Arranging for delivery of food may be more expensive, but may allow the user to sit down to a meal at home sooner than if the user stopped to pick up takeout.

In a further example still, candidate automated assistants may bid to be included in a proposal. A bid may include, for example, a cost (a monetary cost of use, a credit that is redeemable with a particular vendor, application, or service provider, etc.) associated with using the automated assistant in the proposal generally and/or a cost associated with using the automated assistant at a specific point in the proposal (e.g., for one of the first x sub-tasks). For example, if a sub-task involves ordering food for delivery to the user's home, automated assistants provided by specific restaurants may include incentives in the bids such as free delivery, discounts on food, loyalty/rewards programs, or other incentives. Any bids associated with the candidate automated assistants may be considered as additional constraints on the formulation of a proposal.

In optional step 212, rather than autonomously selecting a proposal, the processing system may present a plurality of proposals (as formulated in step 210) to the user, e.g., by forwarding the plurality of proposals to the application executing on the user's end user device. The plurality of proposals may presented in an order that is ranked according to how well the proposals satisfy some constraint (e.g., least expensive to most expensive, least time consuming to most time consuming, etc.).

In step 214, the processing system may send instructions to a set of selected automated assistants, where the instructions assign, to each automated assistant in the set of selected automated assistants, one of the sub-tasks according to a selected proposal (e.g., as formulated in step 210). For instance, a first instruction may assign a first sub-task to a first automated assistant, a second instruction may assign a second sub-task to a second automated assistant, and so on. In one example, the proposal may be selected by the processing system. In another example, the proposal may be selected by the user.

In one example, the instruction to a specific selected automated assistant may define not only the sub-task that the selected automated assistant is to perform, but also one or more constraints on when the selected automated assistant is to perform the sub-task (e.g., after receiving a signal indicating that another selected automated assistant has completed another sub-task or that the user has arrived at a pre-defined location, at a specific time on the clock or after a specific amount of time has elapsed, etc.). For instance, if the sub-task involves ordering food for takeout from a restaurant that is along the user's route home from work, a constraint associated with the sub-task may be to wait to order the food until an automated assistant that is monitoring the user's travel indicates that the user is ten minutes away from the restaurant.

In some examples, step 214 may involve re-sending instructions to newly selected automated assistants when an initially selected automated assistant indicates that the task cannot be completed as instructed (e.g., due to malfunction of the initially selected automated assistant, demands of multiple users on the initially selected automated assistant, the initially selected automated assistant requiring clarification of the assigned sub-task, etc.). In another example, step 214 may involve abandoning or adding sub-tasks (and associated automated assistants) on the fly, e.g., based on the progress of other sub-tasks. Abandoning or adding sub-tasks may also result in the modification of instructions to selected automated assistants assigned to other sub-tasks. For instance, on the user's way to pick up takeout at a restaurant, it may be determined that the user's car is running out of gas. A selected automated assistant that is tasked with navigation may be instructed, by the processing system, to dynamically alter the user's route in order to include a stop at a gas station. In turn, another selected automated assistant that is tasked with submitting the order for takeout may be instructed, by the processing system, to delay submission of the order.

In step 216, the processing system may continuously monitor the progress of the proposal, including the completion of the sub-tasks by the selected automated assistants. Monitoring may be accomplished through the selected automated assistants sending updates to the processing system (e.g., periodically, when sub-tasks or specified percentages of sub-tasks are completed, in response to inquiries from the processing system, etc.). As an example, the processing system may determine, based on communication from an automated assistant that is tasked with ordering takeout for the user to pick up on his way home, that the user has picked up his food. The processing system may further determine, based on communication from an automated assistant that is tasked with navigation, that the user is three miles away from home. The processing system may continue to communicate with the automated assistant that is tasked with navigation until the processing system receives an indication that the user has arrived at home.

However, monitoring does not necessarily imply that the selected automated assistants are waiting on the processing system to provide instructions or authorization to proceed with their sub-tasks. For instance, in one example, the selected automated assistants may be capable of communicating directly with each other. In this case, the instructions sent to a selected automated assistant in step 214 may include the identification and/or contact information (e.g., IP or media access control (MAC) address) of one or more other automated assistants with which the selected automated assistant is to coordinate its actions. Thus, an automated assistant that is tasked with ordering takeout from a restaurant may communicate directly with an automated assistant that is tasked with navigation to provide the location of and pick up time at the restaurant.

In step 218, the processing system may determine (e.g., based on the monitoring) whether the query has been satisfied. For instance, the processing system may determine whether all sub-tasks of the proposal have been completed, where completion of all sub-tasks indicates that the query is satisfied. If the processing system concludes in step 218 that the query has not been satisfied yet, then the method 200 may optionally return to step 214, and the processing system modify the instructions sent to the selected automated assistants (e.g., by changing an instruction already sent to a selected automated assistant, adding a new sub-task, abandoning a yet-to-be-completed sub-task, etc.) as necessary to expedite satisfaction of the query. If no modifications to the instructions are deemed to be necessary, then the method may simply return to step 216, and the processing system may continue to monitor the progress of the proposal.

If, however, the processing system concludes in step 218 that the query has been satisfied, then the method may proceed to optional step 220. In optional step 220, the processing system may obtain feedback regarding the satisfaction of the query. The feedback may be obtained directly from the user, directly from one or more of the selected automated assistants, or may be inferred by the processing system (e.g., based on whether certain constraints on satisfaction of the query were objectively met).

In optional step 222, the processing system may update the user profile and/or other data structures in accordance with the feedback. For instance, if the feedback indicates that the user was dissatisfied with the completion of a specific sub-task, then the processing system may update the user profile to indicate that the automated assistant that performed the specific sub-task should not be used (or should be ranked lower than other candidate automated assistants) when responding to future queries from the user. Similarly, if the feedback indicates that the user was very satisfied with the completion of the specific sub-task, then the processing system may update the user profile to indicate that the automated assistant that performed the specific sub-task should be used (or should be ranked higher than other candidate automated assistants) when responding to future queries from the user.

Optionally, all or part of the feedback received in step 220 could be shared with the vendors who provide the automated assistants. For instance, if a selected automated assistant was implicated in negative feedback received from the user, the vendor who provides the selected automated assistant may want to know so that the vendor can make modifications to improve the performance of the selected automated assistant in the future. Similarly, a vendor may wish to know what factors went into a decision to include or not include a specific automated assistant in a proposal, as this knowledge may help the vendors to modify the specific automated assistant and/or the manner in which the specific automated assistant may be marketed or presented (e.g., in the repository or elsewhere).

In a further example, where the feedback is positive, the processing system may store all or part of the proposal, e.g., as an example of how a specific query was successfully addressed. Thus, when future queries are received that share some similarities with the specific query, all or part of the proposal that formed the response to the specific query may be re-used to formulate proposals for responding to the future queries.

The method 200 may end in step 224.

The method 200 therefore simplifies the performance of tasks by coordinating the actions of a plurality of automated assistants carrying out a plurality of sub-tasks that are part of a response to a larger query. Continuous learning from prior experiences and/or human feedback allows for conflicts between automated assistants to be minimized, so that queries can be addressed more quickly and more efficiently. Additionally, the method 200 allows the actions of automated assistants provided by different vendors to be coordinated in a manner that benefits the user, without requiring an SLA between the vendors.

As discussed above, the method 200 may, in some examples, be carried out by one or more automated assistants rather than by a centralized server. For examples, a first automated assistant may parse complex queries to identify sub-tasks, while another automated assistant may formulate a proposal for carrying out the sub-tasks.

Although examples of the disclosure are described within the context of a user making an explicit request for performance of a task, it should be noted that in some cases, a request for performance of a task may come from an automated assistant, without explicit instruction from the user. For instance, an automated assistant in a user's home may detect the user complaining about the temperature in the home. The automated assistant may communicate with another automated assistant, which may, in turn, adjust a thermostat in the home to make the home warmer or cooler.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an automated assistant or an application server could be implemented as illustrated in FIG. 3.

As depicted in FIG. 3, the system 300 comprises a hardware processor element 302, a memory 304, a module 305 for providing task delegation and cooperation for automated assistants, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for providing task delegation and cooperation for automated assistants may include circuitry and/or logic for performing special purpose functions relating to planning and/or performing tasks on behalf of a user. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing task delegation and cooperation for automated assistants (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing task delegation and cooperation for automated assistants (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
receiving, by a processing system that is in communication with a plurality of automated assistants, a query indicating a task with which a user desires assistance;
parsing, by the processing system, the task into a plurality of sub-tasks including a first sub-task and a second sub-task;
identifying, by the processing system, a first automated assistant of the plurality of automated assistants that is capable of performing the first sub-task and a second automated assistant of the plurality of automated assistants that is capable of performing the second sub-task; and
formulating, by the processing system, a proposal for responding to the query, wherein the proposal comprises a sequence in which the plurality of sub-tasks is to be performed and a mapping that assigns the first sub-task to the first automated assistant and the second sub-task to the second automated assistant, wherein the formulating comprises:
formulating, by the processing system, a plurality of proposals for responding to the query, wherein the proposal is a selected one of the plurality of proposals that is determined to respond to the query while also satisfying a predefined constraint, wherein the predefined constraint is an incentive to utilize the first automated assistant, and the incentive is expressed in a bid by a provider of the first automated assistant.

2. The method of claim 1, further comprising:
sending, by the processing system, a first instruction to the first automated assistant, wherein the first instruction instructs the first automated assistant to perform the first sub-task; and
sending, by the processing system, a second instruction to the second automated assistant, wherein the second instruction instructs the second automated assistant to perform the second sub-task.

3. The method of claim 2, further comprising:
monitoring, by the processing system, a progress of the first sub-task by the first automated assistant and a progress of the second sub-task by the second automated assistant.

4. The method of claim 3, further comprising:
modifying, by the processing system, at least one of: the first instruction or the second instruction, in response to the monitoring.

5. The method of claim 3, further comprising:
receiving, by the processing system, user feedback in response to a satisfaction of the query; and
updating a profile associated with the user, in response to the user feedback.

6. The method of claim 3, further comprising:
receiving, by the processing system, user feedback in response to a satisfaction of the query; and
updating a profile associated with the first automated assistant, in response to the user feedback.

7. The method of claim 6, further comprising:
sharing, by the processing system, the user feedback with a provider of the first automated assistant.

8. The method of claim 1, wherein the parsing is performed using natural language understanding.

9. The method of claim 1, wherein the parsing includes disambiguating between a plurality of potential meanings of the query, and wherein the disambiguating is based on a profile of the user.

10. The method of claim 1, wherein the parsing includes disambiguating between a plurality of potential meanings of the query, and wherein the disambiguating is based on a context of present circumstances of the user.

11. The method of claim 1, wherein the identifying comprises:
searching, by the processing system, an exchange that stores data about respective functionalities of the plurality of automated assistants.

12. The method of claim 11, wherein the searching comprises:
matching a keyword associated with the first sub-task to a tag associated with the first automated assistant in the exchange.

13. The method of claim 1, wherein the predefined constraint is also a monetary cost of the proposal.

14. The method of claim 1, wherein the predefined constraint is also an estimated amount of time needed to carry out the proposal.

15. The method of claim 1, wherein the plurality of automated assistants is further in communication with each other.

16. The method of claim 1, wherein the sequence indicates that the first sub-task is to be performed in parallel with the second sub-task.

17. A device comprising:
a processor of a centralized support center that is in communication with a plurality of automated assistants; and
a computer-readable medium storing instructions which, when executed by the processor, cause the processor to perform operations, the operations comprising:
receiving a query indicating a task with which a user desires assistance;
parsing the task into a plurality of sub-tasks including a first sub-task and a second sub-task;
identifying a first automated assistant of the plurality of automated assistants that is capable of performing the first sub-task and a second automated assistant of the plurality of automated assistants that is capable of performing the second sub-task; and
formulating a proposal for responding to the query, wherein the proposal comprises a sequence in which the plurality of sub-tasks is to be performed and a mapping that assigns the first sub-task to the first automated assistant and the second sub-task to the second automated assistant, wherein the formulating comprises:
formulating a plurality of proposals for responding to the query, wherein the proposal is a selected one of the plurality of proposals that is determined to respond to the query while also satisfying a predefined constraint, wherein the predefined constraint is an incentive to utilize the first automated assistant, and the incentive is expressed in a bid by a provider of the first automated assistant.

18. A non-transitory computer-readable storage medium storing instructions which, when executed by a processor of a centralized support center that is in communication with a plurality of automated assistants, cause the processor to perform operations, the operations comprising:

receiving a query indicating a task with which a user desires assistance;

parsing the task into a plurality of sub-tasks including a first sub-task and a second sub-task;

identifying a first automated assistant of the plurality of automated assistants that is capable of performing the first sub-task and a second automated assistant of the plurality of automated assistants that is capable of performing the second sub-task; and formulating a proposal for responding to the query, wherein the proposal comprises a sequence in which the plurality of sub-tasks is to be performed and a mapping that assigns the first sub-task to the first automated assistant and the second sub-task to the second automated assistant, wherein the formulating comprises:

formulating a plurality of proposals for responding to the query, wherein the proposal is a selected one of the plurality of proposals that is determined to respond to the query while also satisfying a predefined constraint, wherein the predefined constraint is an incentive to utilize the first automated assistant, and the incentive is expressed in a bid by a provider of the first automated assistant.

19. The non-transitory computer-readable storage medium of claim 18, wherein the operations further comprise:

sending a first instruction to the first automated assistant, wherein the first instruction instructs the first automated assistant to perform the first sub-task; and sending a second instruction to the second automated assistant, wherein the second instruction instructs the second automated assistant to perform the second sub-task.

20. The non-transitory computer-readable storage medium of claim 19, wherein the operations further comprise:

monitoring a progress of the first sub-task by the first automated assistant and a progress of the second sub-task by the second automated assistant.

\* \* \* \* \*